United States Patent
Verdier et al.

(10) Patent No.: US 9,685,006 B2
(45) Date of Patent: Jun. 20, 2017

(54) METHOD AND DEVICE FOR INSERTING A 3D GRAPHICS ANIMATION IN A 3D STEREO CONTENT

(71) Applicant: THOMSON LICENSING, Issy de Moulineaux (FR)

(72) Inventors: Alain Verdier, Vern sur Seiche (FR); Anita Orhand, Rennes (FR); Valter Drazic, Betton (FR)

(73) Assignee: THOMSON LICENSING DTV, Issy-les-Moulineaux (FR)

( * ) Notice: Subject to any disclaimer, the term of this patent is extended or adjusted under 35 U.S.C. 154(b) by 125 days.

(21) Appl. No.: 14/377,500

(22) PCT Filed: Feb. 6, 2013

(86) PCT No.: PCT/EP2013/052300
§ 371 (c)(1),
(2) Date: Aug. 7, 2014

(87) PCT Pub. No.: WO2013/120742
PCT Pub. Date: Aug. 22, 2013

(65) Prior Publication Data
US 2016/0019724 A1    Jan. 21, 2016

(30) Foreign Application Priority Data

Feb. 13, 2012 (EP) .................................. 12305157
Jun. 28, 2012 (EP) .................................. 12174023

(51) Int. Cl.
*G06T 19/20* (2011.01)
*H04N 13/00* (2006.01)
(Continued)

(52) U.S. Cl.
CPC .............. *G06T 19/20* (2013.01); *G06T 13/20* (2013.01); *H04N 13/004* (2013.01);
(Continued)

(58) Field of Classification Search
USPC ........................................ 345/419, 422, 473
See application file for complete search history.

(56) References Cited

U.S. PATENT DOCUMENTS 6,798,406 B1 * 9/2004 Jones ................. H04N 13/0011
345/419
7,450,132 B2 * 11/2008 Park ........................ G06T 15/04
345/422

(Continued)

FOREIGN PATENT DOCUMENTS

CN        101653011 A    2/2010
JP        2010086228 A   4/2010

(Continued)

OTHER PUBLICATIONS

Search Report:Apr. 15, 2013.

*Primary Examiner* — Kimbinh T Nguyen
(74) *Attorney, Agent, or Firm* — Tutunjian & Bitetto, P.C.

(57) ABSTRACT

The invention concerns a method and a device for inserting 3D graphic animation in a 3D image, each 3D graphic element of the graphic animation being defined in size and in depth for the insertion in a determined insertion zone of said 3D image. The method comprises the step of determining for the graphic element to be inserted a depth range with a maximum allowed depth value, replacing the out of range depth values by the maximum allowed depth value when depth values of the graphic element are out of range and compensating the depth difference between the depth values of the graphic element and the maximal allowed depth value in reducing the graphic element in size proportionally to the reduction of depth for the graphic element.

13 Claims, 2 Drawing Sheets

Figure 1:
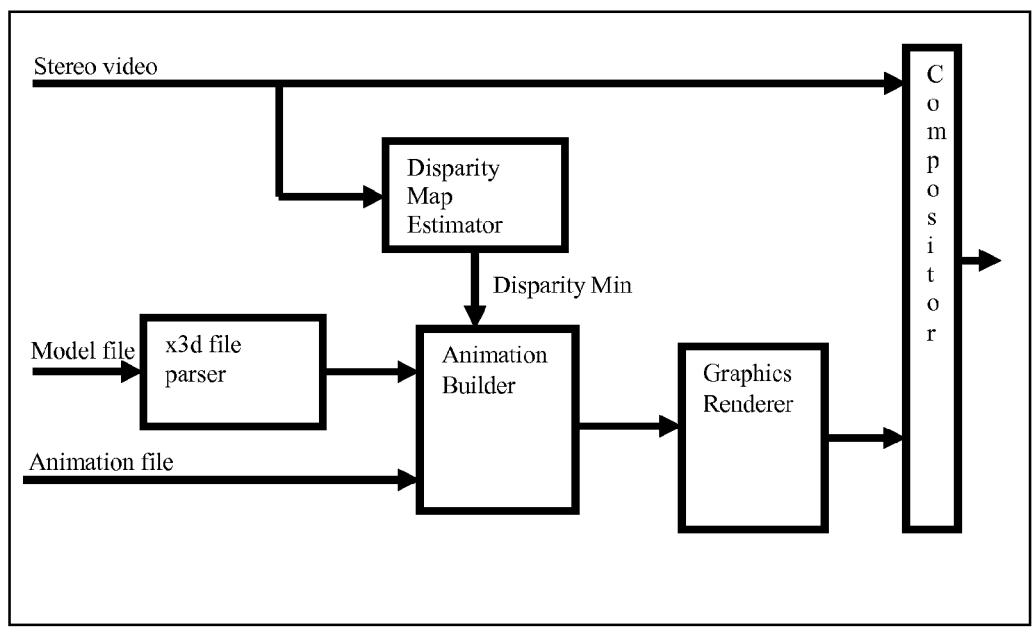

(51) Int. Cl.
*G06T 13/20* (2011.01)
*H04N 13/02* (2006.01)

(52) U.S. Cl.
CPC ....... *H04N 13/007* (2013.01); *H04N 13/0018* (2013.01); *H04N 13/0022* (2013.01); *G06T 2200/04* (2013.01); *H04N 13/0275* (2013.01)

(56) References Cited

U.S. PATENT DOCUMENTS

| | | | |
|---|---|---|---|
| 8,217,941 B2 * | 7/2012 | Park | G06T 15/205 345/427 |
| 8,228,327 B2 * | 7/2012 | Hendrickson | H04N 13/0022 345/420 |
| 9,030,533 B2 * | 5/2015 | Aubey, Jr. | H04N 13/007 348/42 |
| 2005/0286756 A1 * | 12/2005 | Hong | G06K 9/20 382/154 |
| 2008/0211810 A1 | 9/2008 | Falchetto | |
| 2009/0040295 A1 | 2/2009 | Koo et al. | |
| 2009/0135193 A1 | 5/2009 | Strom et al. | |
| 2009/0201288 A1 * | 8/2009 | Fischer | G06T 15/00 345/419 |
| 2011/0018966 A1 | 1/2011 | Kitazato | |
| 2011/0074770 A1 | 3/2011 | Robinson et al. | |
| 2011/0169825 A1 | 7/2011 | Ishiyama et al. | |
| 2011/0193860 A1 | 8/2011 | Lee et al. | |
| 2011/0199459 A1 | 8/2011 | Barenbrug et al. | |
| 2011/0292176 A1 * | 12/2011 | Jung | H04N 5/445 348/43 |
| 2012/0002014 A1 * | 1/2012 | Walsh | G06T 19/006 348/47 |

FOREIGN PATENT DOCUMENTS

| | | |
|---|---|---|
| JP | 2011029849 A | 2/2011 |
| JP | 2011130133 A2 | 6/2011 |
| JP | 2012516505 A | 7/2012 |
| WO | WO2004051577 | 6/2004 |
| WO | WO2008038205 | 4/2005 |
| WO | WO2005060271 | 6/2005 |
| WO | WO2008038205 | 4/2008 |
| WO | 2008115222 A1 | 9/2008 |
| WO | WO2009083863 | 7/2009 |
| WO | 2010088070 A1 | 8/2010 |
| WO | 2010151155 A1 | 12/2010 |
| WO | WO2011005544 | 1/2011 |

* cited by examiner

//METHOD AND DEVICE FOR INSERTING A 3D GRAPHICS ANIMATION IN A 3D STEREO CONTENT

This application claims the benefit, under 35 U.S.C. §365 of International Application PCT/EP2013/052300, filed Feb. 6, 2013, which was published in accordance with PCT Article 21(2) on Aug. 22, 2013 in English and which claims the benefit of European patent application No. 12305157.5, filed Feb. 13, 2012, and the benefit of European patent application No. 12174023.7, filed Jun. 28, 2012.

The present invention relates to a method and device for inserting a 3D graphics animation in a 3D stereo content. The invention applies mainly to post-production environment as it concerns graphic insertion but also to consumer products including STB, BD-player, TV sets, Smart phones, Tablets with 3D capabilities. The invention can be used every time a 3D Graphics content is generated to be displayed on a 3D display.

The invention aims at resolving the problem of depth perception conflicts when overlaying animated graphics on top of 3D video layer. Indeed, if the occlusion clues do not match the depth cues, it creates a visual discomfort, cause of headache or nausea. When the 3D graphics is animated in the depth direction it is even more likely that a conflict would occur.

There are a great number of patents and articles describing how to avoid overlap when mixing two stereo contents: most of the time, one is video (real image, primary), the other is graphics (virtual image, secondary). Usually, it is proposed to shift one of the two contents so there is no more overlap. Sometimes it is suggested to compress the depth range because it is not always possible to keep the two incoming contents within the comfort range (convergence/accommodation issue). WO2008038205A2(Philips) and US20110199459NV describe such method.

The invention aims to improve the use case where there is an animation that makes a graphic element to appear or disappear. With 2D display it is quite simple, because in 2D display a visual perception conflict can never occur, a 2.5D animation (3D animated but projected onto a single 2D window) gives good results: the graphics disappear because of the depth that goes to infinite during the 3D animation. On 3D display, it is likely that the element will conflict with other objects of the real scene, at least with the background (probably not at infinite) but also likely from time to time with other objects of the real scene that might be at screen level or even popping out of the screen.

It is an object of the invention to address the above mentioned problems of overlapping of graphic animation with objects of the 3D scene.

The invention consists in a method of inserting graphic animation in a 3D image, each 3D graphic element of the graphic animation being defined in size and in depth for the insertion in a determined insertion zone of said 3D image.

The method comprises a step of determining for the graphic element to be inserted a maximal allowed depth value corresponding to the minimum depth value of the image in the determined insertion zone so that the graphic element is not overlapped by the corresponding part of the 3D image in said predetermined insertion zone further, the method comprises a step of, when a depth value of the graphic element to be inserted is superior to the maximal allowed depth value, keeping the depth value of the graphic element by the maximal allowed depth value and compensating the depth difference between the depth value of the graphic element to be inserted which is superior to the maximal allowed depth value and the maximal allowed depth value in reducing the graphic element in size proportionally to the reduction of depth for the graphic element.

The use of the invention will show-up a change in the graphics size in the 2D space while the disparity is kept constant.

In a preferred embodiment, the method comprises furthermore the step of determining a bounding box arounding the graphic element so that the size and the depth value of the bounding box replace the size and depth value of the graphic element.

In a preferred embodiment a bounding box arounding different graphic elements moving together is defined.

In a preferred embodiment the maximum allowed depth value is determined so that the overlapping of graphic element by objects of the 3D image is avoided.

In a preferred embodiment the maximum allowed depth value is selected by a spectator.

In a preferred embodiment the method of inserting graphic animation in a 3D image is applied to post production environment.

In a preferred embodiment the method of inserting graphic animation in a 3D image applies to consumer products.

In a preferred embodiment the maximum allowed depth for at least a graphic element to be inserted is determined so that overlapping of the 3D image is avoided.

The invention concerns, too, a device for inserting graphic animation in a 3D image, each graphic element of the graphic animation being defined in size and in depth for the insertion in a determined insertion zone of said 3D image.

The device comprises means for determining for the graphic element to be inserted a maximal allowed depth value corresponding to the minimum depth value of the image in the determined insertion zone so that the graphic element is not overlapped by the corresponding part of the 3D image in said predetermined insertion zone; means for keeping the depth value of the graphic element by the maximal allowed depth value when a depth value of the graphic element to be inserted is superior to the maximal allowed depth value, and means for compensating the depth difference between the depth value of the graphic element to be inserted which is superior to the maximal allowed depth value and the maximal allowed depth value in reducing the graphic element in size proportionally to the reduction of depth for the graphic element.

The invention has the advantage that there are no more visual perception conflicts on appearing or disappearing graphics. By the way it preserves the original stereo video content as no shift is done to prevent overlapping of the video content.

Figure 2:
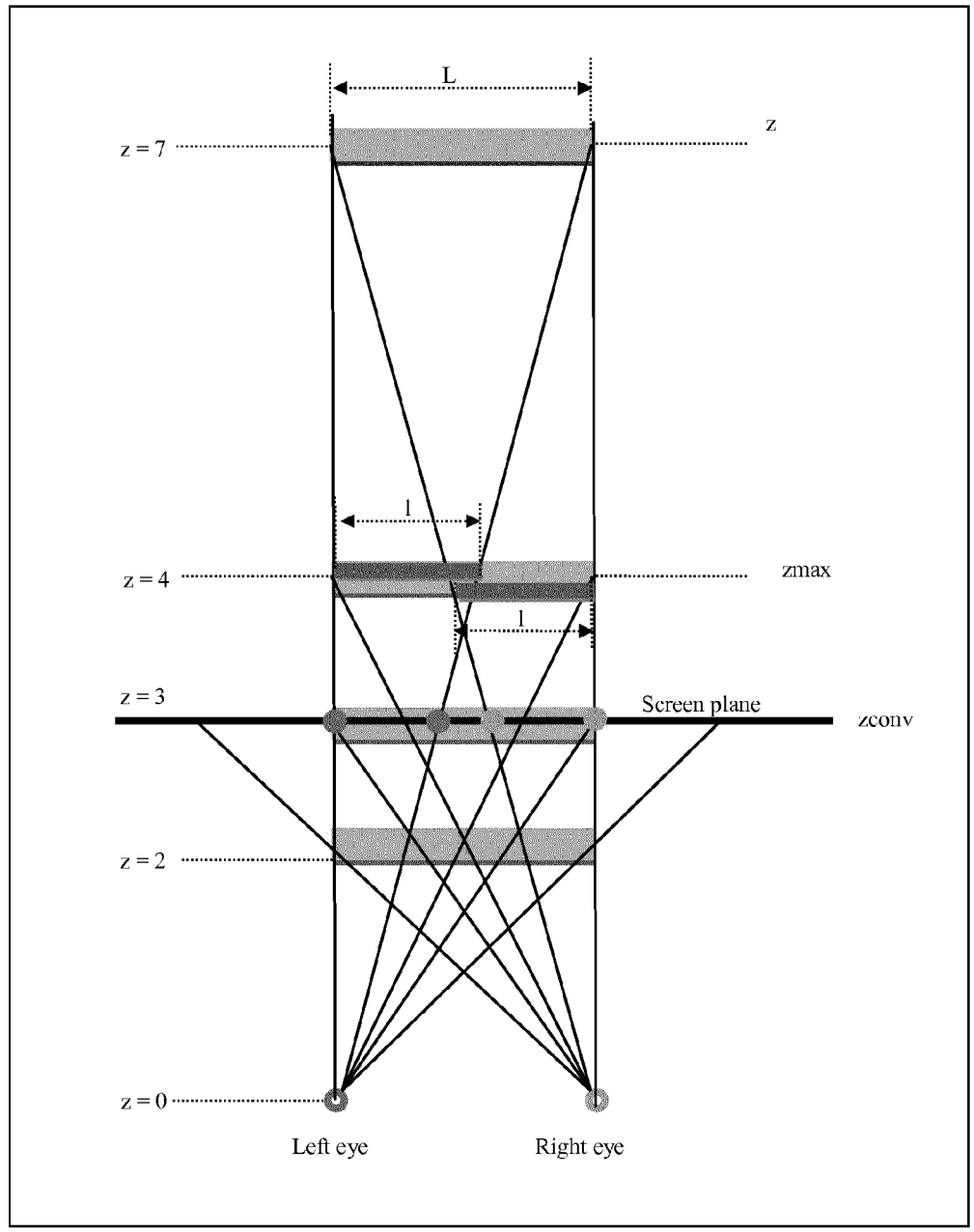

The features and advantages of the invention will be further explained upon reference to following drawings in which FIG. 1 illustrates an implementation of the invention;

and FIG. 2 illustrates plane and associated depth to explain the invention.

The invention proposes a method that changes the geometrical transformation issued from the initial animation scenario into a different one keeping the graphics element within a safe depth range assuring no overlap with real scene depth budget while giving the impression to have the graphic element going from/to the infinite (size=0). This is achieved by updating the scale parameters together with the translation parameters. Scale parameters are defined as the maximal length and maximal width of the graphic element.

Translation parameter is the depth value. The graphic element is thus defined in size with the scale parameters.

The 3D graphics are usually modeled by a 3D modeling tool. Different modeling tools such as Blender, Cinema4D, Maya and AutoDesk are well known.

These authoring tools can export a model of the virtual scene in format as per example, xml, x3d, vrml, dae, dxf, fbx or obj.

The model is basically described as a tree containing a number of elements, each of them is defined as a basic shape associated to a color or texture and a transformation function such as translation, rotation or scaling.

Implementation of the invention, as represented by FIG. 1, takes as inputs:
- a model file which contains the specification of the 3D graphics.
- an animation file: contains the specification of the animation, basically the transform between entry point and ending point such as translation, rotation or scaling, the number of frames and the speed of the animation.
- the incoming stereo video.

It outputs the composited video formed by the combination of the 3D graphics and the incoming stereo video.

It contains the following modules:
- a x3d file parser module: this module reads the file and build the graphics object element by element, using OpenGL functions (vertex building and transform operations).
- A disparity estimator module: this module computes a sparse disparity map and issue the minimum value over a programmable area. This area can be the full screen but more likely the part of the screen where the graphics is supposed to be inserted.
- An animation builder module: this module check whether the animated graphics depth will overlap with the real video or not. If not, the parameters included in the animation file are used as is, otherwise the parameters are changed.
- A graphics renderer module: this is the module responsible for the rendering. It takes the animation script from the animation builder and executes OpenGL operations accordingly.
- A composition module permits to combine the corrected graphic element to the 3D stereo video image As the estimator runs on the incoming left and right 2D images, it does not provide directly the depth value but rather a value of disparity between left and right pictures. The relation that links the disparity value to the depth value is well known for a person skilled in the art.

If we know the setting of virtual graphics in term of focal length, baseline and depth of convergence plane we can get the resulting disparity for every graphic element. If we know the farer depth z (obtained after vertex building and transformation) then we can get the equivalent disparity and compare with the one provided by the disparity estimator.

The correction method is the method used by the Animation Builder to change the initial animation script so as to prevent for visual perception conflicts. For every frame the Animation Builder shall check over the resulting disparity for the graphics.

In case the depth (disparity) is bigger than the one from the depth (disparity) estimator, then a correction is needed.

As illustrated with FIG. 2, instead of pushing backward the graphic element, it is rather reduced in size determined by the length and the width of the graphic element and kept at the maximum allowed depth corresponding to zmax (z=4) on the figure. The depth range is thus limited by the maximum depth value zmax.

The following diagram shows how to get the illusion of an object going far away by reducing the size of the object. The relation between size on the screen zconv (z=3) and actual size and depth z (z=7) is the following:

$$l/L = Zmax/Z$$

With:
L: initial object length size
I: corrected length size
Zmax: maximum allowed depth The width of the object will be adapted on the same way.

The two rectangles at zmax (z=4) represent a smaller object that would have been perceived with the same size on the 2D screen from respectively the left (circle at z=0) and right eye (circle at z=0) compared to the original object located at a depth of z (z=7) Obviously only one object shall be rendered, centered with respect to the object located at zmax but with a scale factor of zmax/z.

In an embodiment of the invention, for example, at post-production level, graphic inserts can add a logo or indicate a score/player name in case of sports or also name/title for a singer.

At consumer device level, this can be the user interface that requires graphic insertion, either to browse a menu, or to get additional data linked to the content (EPG) or to the user preference as for example: widget for social network, weather forecast, stock market.

In an embodiment of the invention, a script relative to the graphic insertion and its own depth can determine the depth of this insertion depending of various functions or various scenarios. In an embodiment of the invention, the graphic should disappear in the horizon.

In another embodiment, the depth of a graphic can evolve in function of the time. It means that the depth is a linear (or not) and function of the time.

The method consists to render an animated 3D graphics element by changing the element size instead of the depth value, if the depth value is over the maximum allowed depth. Thus a compensation of the depth difference between the depth of the graphic element and the maximal allowed depth value is done in reducing the graphic element in size proportionally to the reduction of depth for the graphic element.

The determination of a bounding box arounding the graphic element will permit to consider the depth value, the length value and the width value of the bounding box at the place of the graphic element. There is a possibility for defining a bounding box for different graphic elements moving together inside of the bounding box and to consider the insertion of this bounding box at the place of the different graphic elements.

The depth, length and width values are respectively maxima value of the depth, length and width values of the graphic element or a volume surrounding the different graphic elements or a volume surrounding part of the graphic elements.

The depth, length and width values of the graphic element or of the bounding box are determined data imported with the data corresponding to the graphic element.

The maximal depth value of a 3D element corresponds to the depth value of the pixel representing the most distant point of the element. As the element being defined in size by its length, width and depth values, modification of the maximal depth value are calculated so that the proportion in size of the graphic element is respected.

Thus if a scenario indicates that a graphic element is moving in a 3D image, as soon as the maximal depth value reach the given limits, the size of this element will be modified in proportion to the depth value for the graphic element indicated by the scenario.

The depth value is fixed relative to the 3D depth of the screen displaying the 3D image to a spectator.

The invention claimed is:

1. A method of inserting a graphic element in a 3D image, executed by an electronic device associated with a display device for displaying the 3D image, the method comprising:

Obtaining for the graphic element to be inserted, at least a length L of said graphic element, a depth z associated with said graphic element for the insertion and an insertion zone in said 3D image;

Determining for the graphic element to be inserted a maximal allowed depth value $z_{max}$ corresponding to the minimum depth value of the image in the insertion zone so that the graphic element is not overlapped by the corresponding part of the 3D image in said insertion zone;

When a depth value of the graphic element to be inserted is superior to the maximal allowed depth value, keeping the depth value of the graphic element by the maximal allowed depth value;

compensating the depth difference between the depth value of the graphic element to be inserted which is superior to the maximal allowed depth value and the maximal allowed depth value in reducing the graphic element in size proportionally to the reduction of depth for the graphic element in such a way that said graphic element, positioned at the maximal allowed depth value $z_{max}$, has at least a length value I equal to $(z_{max}*L)/z$; and displaying the 3D image with the inserted graphic element on the display device.

2. The method of claim 1, further comprising determining a bounding box around the graphic element so that at least a length and a depth value of the bounding box replace said at least the length L and depth z associated with the graphic element.

3. The method of claim 2, wherein the graphic element to be inserted further comprises a width W, and wherein said reducing further comprises a size reduction such that said graphic element, positioned at the maximal allowed depth value zmaxc has a width value w equal to (zmax*W)/z.

4. The method of claim 1, wherein the insertion is applied to post production environment.

5. The method of claim 1, wherein the insertion is applied to consumer products.

6. An electronic device for inserting a graphic element in a 3D image, said electronic device being associated with a display device for displaying the 3D image, wherein the electronic device comprises:

a memory;

at least one processor coupled to the memory, the at least one processor being configured to:

obtain for the graphic element to be inserted, at least a length L of said graphic element, a depth z associated with said graphic element for the insertion and an insertion zone in said 3D image;

determine for the graphic element to be inserted a maximal allowed depth value $z_{max}$ corresponding to the minimum depth value of the image in the insertion zone so that the graphic element is not overlapped by the corresponding part of the 3D image in said insertion zone;

keep the depth value of the graphic element by the maximal allowed depth value when a depth value of the graphic element to be inserted is superior to the maximal allowed depth value, and compensate the depth difference between the depth value of the graphic element to be inserted which is superior to the maximal allowed depth value and the maximal allowed depth value in reducing the graphic element in size proportionally to the reduction of depth for the graphic element such that said graphic element, positioned at the maximal allowed depth value $z_{max}$, has at least a length value I equal to $(z_{max}*L)/z$.

7. The electronic device for inserting a graphic element in a 3D image according to claim 6, wherein said at least one processor further determines a bounding box around the graphic element so that at least a length and a depth value of the bounding box replace said at least length L and depth z associated with the graphic element.

8. The electronic device for inserting a graphic element in a 3D image according to claim 6, wherein the graphic element to be inserted has further a width W, and wherein said at least one processor is further configured to perform a size reduction such that said graphic element, positioned at the maximal allowed depth value $z_{max}$, has a width value w equals to $(z_{max}*W)/z$.

9. The electronic device for inserting a graphic element in a 3D image according to claim 7, wherein the graphic element to be inserted has further a width W, and wherein said at least one processor is further configured to perform a size reduction such that said graphic element, positioned at the maximal allowed depth value $z_{max}$, has a width value w equals to $(z_{max}*W)/z$.

10. The method of claim 2, wherein the insertion is applied to post production environment.

11. The method of claim 3, wherein the insertion is applied to post production environment.

12. The method of claim 2, wherein the insertion is applied to consumer products.

13. The method of claim 3, wherein the insertion is applied to consumer products.

* * * * *